(12) United States Patent
Harris

(10) Patent No.: US 8,839,261 B1
(45) Date of Patent: *Sep. 16, 2014

(54) GUARANTEED CORE ACCESS IN A MULTIPLE CORE PROCESSING SYSTEM

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/556,463

(22) Filed: Jul. 24, 2012

Related U.S. Application Data

(63) Continuation of application No. 11/746,544, filed on May 9, 2007, now Pat. No. 8,230,431.

(51) Int. Cl.
*G06F 9/46* (2006.01)
*G06F 7/38* (2006.01)
*G06F 9/50* (2006.01)
*G06F 9/30* (2006.01)

(52) U.S. Cl.
CPC .............. *G06F 9/466* (2013.01); *G06F 9/5005* (2013.01); *G06F 9/30152* (2013.01)
USPC ........................... 718/104; 718/101; 712/231

(58) Field of Classification Search
CPC .... G06F 9/466; G06F 9/5005; G06F 9/30152
USPC .................................. 718/101, 104; 712/231
See application file for complete search history.

(56) References Cited

U.S. PATENT DOCUMENTS

| | | |
|---|---|---|
| 5,263,146 A | 11/1993 | Mishima |
| 7,152,150 B2 | 12/2006 | Sato et al. |
| 7,814,336 B1 | 10/2010 | Nisbet et al. |
| 7,865,894 B1 | 1/2011 | Nordquist et al. |
| 2002/0124126 A1 | 9/2002 | Foster et al. |

*Primary Examiner* — Camquy Truong
(74) *Attorney, Agent, or Firm* — Law Office of Scott C. Harris, Inc.

(57) ABSTRACT

Exclusive access to a core or part of a core, or to multiple cores, but in any case less than all of the cores, of a multiple core processing system. The access can be requested by an instruction, or by a routine. Once granted, the access provides exclusive access to the core so that a program can be run which requires substantially uninterrupted access to the core.

17 Claims, 1 Drawing Sheet

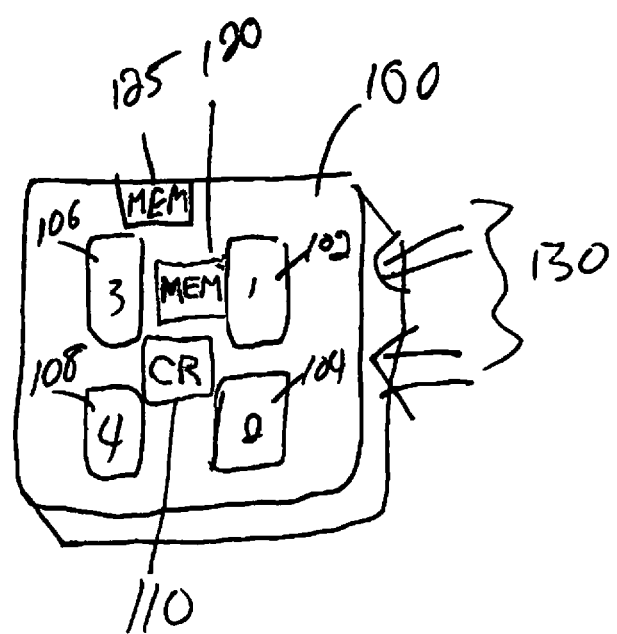

GUARANTEED CORE ACCESS IN A MULTIPLE CORE PROCESSING SYSTEM

This is a continuation of application Ser. No. 11/746,544, filed May 9, 2007, the entire contents of which are herewith incorporated by reference.

BACKGROUND

Microprocessors are known in which one or more cores is located on the same processor chip. For example, the Intel Core2Duo™ may have 4 cores on the same semiconductor chip. Each core is capable of carrying out specified arithmetical and other operations based on instructions and based on parameters that are provided to the chip.

SUMMARY

The present application describes a technique of providing exclusive or semi-exclusive core access, as necessary.

BRIEF DESCRIPTION OF THE DRAWINGS

These and other aspects will now be described in detail with reference to the accompanying drawings, wherein:

FIG. 1 illustrates a block diagram of a multiple core chip.

DETAILED DESCRIPTION

A microprocessor with multiple processing elements or "cores" is illustrated in FIG. 1. The chip 100 may include, preferably on a single substrate, multiple processing cores shown in the embodiment as 102, 104, 106, 108. A core arbiter 110 is also shown, connected to the cores. In another embodiment, one of the cores such as 102 may also serve as the core arbiter. The arbiter assigns tasks to a core based on a queue of tasks indicating how busy the core is. In another embodiment, described in my copending application Ser. No. 11/371,062, the arbiter may assign tasks based on temperatures of the cores.

Each core may include an associated memory such as 120 that is closely associated with the core and thereby facilitates the operations carried out by the processing within the core. Each memory may be individually associated with a core and there may alternatively or additionally be memory 125 on the chip that is associated with all the cores. In the embodiment, the arbiter 110 may also dynamically assign portions from the global memory 125 to different cores.

Data and power 130 is applied to the chip. The data may include both instructions to be carried out by the chip, and also parameters to be used with those instructions.

An embodiment recognizes that certain tasks, for example tasks that are carried out in real time, may require, or may be improved by, providing some coherency to the tasks. Certain housekeeping functions are carried out by an operating system, and consequently these housekeeping functions as well as other functions of the computer, may take up certain amounts of the processor's processing power. However, it may be desirable to be able to provide exclusive or core access, or some guaranteed portion of core access, to one or more cores for certain programs that rely on real-time operation or would benefit from such real time operation.

Examples, may include, for example, real-time video. When watching real-time video, it is often very disconcerting when there are lags in the video, especially when those lags are caused by the processing carried out by the processor. A video processor may require variable amounts of processing power. For example, when playing back a highly compressed item of video, the keyframes of the video may require more processing power than other frames. The operation of dynamically assigning a video to different amounts of processing power depending on its needs may be most efficient in terms of resources, but may not produce the best product. Analogously, when writing certain kinds of disks at high speed, the best write may be obtained when there is always sufficient amount of processing power available to carry out the write. Still other programs may rely on, or be improved by, certain tasks being finished in a specified time.

In very high compressed video, or in video that has been compressed and also encrypted for various reasons, it may be necessary to carry out a first operation to produce a byproduct, and feed that byproduct to another calculator that is also running in real-time. In that event, it may be desirable to obtain exclusive access to two different cores, a first one which carries out the first part of the operation, and the second one which carries out a second part of the operation. The two different cores may have exclusive access requested at different times.

According to an embodiment, an exclusive core access technique includes a program or instruction that requires access to one or more cores on a multicore processing system. The program or instruction in effect says 'I need exclusive access or guaranteed percentage access to either a core or multiple cores. When I get this access, I need it for a specified amount of time without interruption".

The form of the instruction may be

EXCLUSIVECORE-T2 FUN (need access to a core for 2 seconds, use that access to run the routine called "FUN")

EXCLUSIVECORE-2-T0 FUN1 (need access to 2 cores for an undescribed time, until the called routine, here FUN1 ends).

Until that access is available, the program or routine preferably will not run.

The instruction may also be a processor level instruction, or an operating system level instruction.

This is very different than threads being interactively assigned to cores. That operation is one which occurs whenever the core has some capability. This technique is the opposite—a request for real-time access, even if it means wasting processor resources.

Another embodiment may request access to multiple cores with one core feeding data directly into another core or feeding the data via a local memory. Since the cores feed data directly, the data does not need to be stored in any special way or identified. The cores are doing only one thing, and hence there are no other threads doing other things.

The instructions form a group that is not accessed until the granting of the exclusive core access to the two cores, and the connection of data between the cores. Another words, the arbiter, either a standalone unit or some other unit, waits until it is able to provide this exclusive access; and at that time provides exclusive access to those cores until the access period is ended. This is done even if the access may be less than optimal and even if the access may waste processor resources. Those resources are wasted so that the program gets exclusive access and does not interfere with other programs.

This may take the form

EXCLUSIVECOREFEEDING-T2 FUNFUN

Again, this goes against the conventional wisdom for threads which are allocated wherever there is room for such a thread to carry out a certain operation. Threads are used to provide the most efficient use of processor resources. In contrast, the core access system described herein uses a very different kind of system: in which core access is guaranteed even when that access makes inefficient use of the resource. This grants the ability to use all of the resource, thereby trading off performance against guaranteed core access.

The above has described exclusive access, i.e. where absolutely nothing else is running on the core. However, the general nature of a processor may make this impossible or impractical. For example, it may be that there are certain housekeeping or background routines that run on the processor all the time or substantially all the time. For purposes of this application, the term exclusive access means that no other program is allowed access to the core. Programs may still be running, but the access is exclusive in the sense that only one program is actually assigned to a core, while other background routines, housekeeping routines, and the like can still run on the same core within the meaning of exclusive.

Another embodiment may use semi-exclusive access, where access is given to some specified percentage of the core's resources. For example, a program may require that it has at least 70% of the cores resources. The instruction may be in the form SEMIEXCLUSIVEACCESS-70 FUNFUNFUN (give me semi-exclusive access to 70% of the core's resources, so I can run the routine funfunfun on it.)

This instruction automatically reserves 70% of the core's capabilities for running that routine.

The general structure and techniques, and more specific embodiments which can be used to effect different ways of carrying out the more general goals are described herein.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the instructions can be part of a higher level language, such as C or basic.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The instructions may be in assembler, C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A programmed processor system, comprising:
a microprocessor, programmed to provide a first amount of access to a first executing routine based on a request, said first amount of access being a specified nonzero percentage of a total amount of resources of the microprocessor, said microprocessor operating, based on said first amount of access being granted, to execute said first executing routine using said first amount of access granted responsive to said request, and while said first amount of access is granted, said microprocessor operating for preventing any other routine from being assigned to said percentage of a total amount of resources of the microprocessor that conflicts with said first amount of access granted responsive to said request,
wherein said request includes a first instruction of a first form that requests said first amount of access that represents said specified nonzero percentage of total amount of resources of the microprocessor as a percentage of total processing power of the microprocessor, and said first instruction having parameters associated with said first instruction including an amount of access to said resources and a time parameter indicating how long said first amount of access is requested.

2. The processor system as in claim 1, wherein said microprocessor is a multiple core microprocessor, said request is for access of a specified amount to at least one core, but less than all of the cores, of said multiple core microprocessor.

3. The processor system as in claim 2, wherein said request for access is an access to multiple cores.

4. The processor system as in claim 2 said request is for exclusive access to at least one core of said multiple core microprocessor, and said microprocessor operates to prevent any other routine from being assigned to said at least one core.

5. The processor system as in claim 1, wherein said request specifies that the first amount of access should be granted until the routine is completed, and wherein said first amount of access is granted by said microprocessor until the routine completes.

6. The processor system as in claim 1, wherein said request specifies that the first amount of access should be granted for a specified amount of time, and wherein said first amount of access is granted by the microprocessor for said specified amount of time.

7. The processor system as in claim 1, wherein said request specifies said first amount of access as a percentage of total resources of said microprocessor.

8. A programmed processor system, comprising:
a microprocessor, programmed to provide a first amount of access to a first executing routine based on a request, said first amount of access being a specified nonzero percentage of a total amount of resources of the microprocessor, said microprocessor first determining other routines other than said first routine which are at least one of running or requesting access, based on said first determining by said microprocessor, second determining if said first amount of access can be granted at a current time, and if said first amount of access cannot be granted at a current time, causing said first executing routine to wait and not executing said first executing routine until a later time, and at said later time, again determining if said first amount of access can be granted, and if said first amount of access cannot be granted, causing said first executing routine to wait again, and if said first amount of access can be granted, then executing said first executing routine using said first amount of access and preventing any other routine from being assigned to said with said first amount of access granted responsive to said request, wherein said request includes a first instruction of a first form that requests a first amount of access to a first executing routine, said first amount of access being a specified nonzero percentage of a total amount of resources of the microprocessor, and said first instruction having parameters associated with said first instruction including an amount of access to said resources that represents a percentage of total processing power of the microprocessor and a time parameter indicating how long said first amount of access is requested.

9. The processor system as in claim 8, wherein said microprocessor is a multiple core microprocessor, said request is for access of a specified amount to at least one core, but less than all of the cores, of said multiple core microprocessor.

10. The processor system as in claim 9 said request is a request for exclusive access to at least one core of said multiple core microprocessor, and said microprocessor operates to prevent any other routine from being assigned to said at least one core.

11. The processor system as in claim 8, wherein said request specifies that the first amount of access should be granted until the routine is completed, and wherein said first amount of access is granted by said microprocessor until the routine completes.

12. The processor system as in claim 8, wherein said request specifies that the first amount of access should be granted for a specified amount of time, and wherein said first amount of access is granted by the microprocessor for said specified amount of time.

13. The processor system as in claim 8, wherein said request specifies said first amount of access as a percentage of total processing power of the microprocessor.

14. A computer having a set of instructions on a tangible, non-transitory, machine-readable medium, said set of instructions including a first instruction of a first form that requests a first amount of access to a first executing routine, said first amount of access being a specified nonzero percentage of a total amount of resources of a processor, and said first instruction having parameters associated with said instruction including an amount of access to said resources and a time parameter indicating how long said first amount of access is requested, said set of instructions causing, when executed, a computer to:

execute said first executing routine using said access granted responsive to said first instruction, and preventing any other routine from being assigned to said processor that would prevent said first executing routine from obtaining said first amount of access, wherein said first instruction requests said first amount of access that represents said specified nonzero percentage of total amount of resources of the processor, and said first instruction having parameters associated with said first instruction including an amount of access to said resources and a time parameter indicating how long said first amount of access is requested.

15. The computer as in claim 14, wherein said time parameter represents a fixed time during which said first executing routine will receive said first amount of access.

16. The computer as in claim 14, wherein said time parameter represents that said first executing routine will receive said first amount of access until said first executing routine completes its operation.

17. The computer as in claim 14, wherein said computer includes a multiple core microprocessor, said request is for access of a specified amount to at least one core, but less than all of the cores, of said multiple core microprocessor.

* * * * *